United States Patent
Chanon et al.

(10) Patent No.: US 12,038,244 B2
(45) Date of Patent: Jul. 16, 2024

(54) PIPE CONNECTION ARRANGEMENT FOR A HEAT EXCHANGER

(71) Applicant: Carrier Corporation, Palm Beach Gardens, FL (US)

(72) Inventors: Jean-Pierre Chanon, Montluel (FR); Renaud Nadin, Barr (FR); Jeremy Wallet-Laily, Montluel (FR); Brice Rousville, Montluel (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 763 days.

(21) Appl. No.: 17/133,750

(22) Filed: Dec. 24, 2020

(65) Prior Publication Data

US 2021/0333057 A1    Oct. 28, 2021

(30) Foreign Application Priority Data

Apr. 24, 2020   (EP) ..................................... 20171435

(51) Int. Cl.
*F28F 9/02* (2006.01)

(52) U.S. Cl.
CPC ........ *F28F 9/0251* (2013.01); *F28F 2275/20* (2013.01)

(58) Field of Classification Search
CPC .................................................... F28F 9/0251
See application file for complete search history.

(56) References Cited

U.S. PATENT DOCUMENTS

| 3,712,647 A | * | 1/1973 | Stecher | F16J 15/127 |
| | | | | 285/341 |
| 3,897,116 A | * | 7/1975 | Carpenter | F16C 17/246 |
| | | | | 384/624 |
| 4,012,103 A | * | 3/1977 | Lunquist | A61N 1/3752 |
| | | | | 200/51.09 |

(Continued)

FOREIGN PATENT DOCUMENTS

| EP | 1843072 A2 | 10/2007 |
| EP | 2365260 A2 | 9/2011 |

(Continued)

OTHER PUBLICATIONS

European Serach Report for European Application No. 20171435.9, Filing Date Apr. 24, 2020, dated Oct. 20, 2020, 9 pages.

*Primary Examiner* — Kevin R Barss
(74) *Attorney, Agent, or Firm* — CANTOR COLBURN LLP (57) ABSTRACT

There is provided a pipe connection arrangement for a heat exchanger and a method of connecting a pipe to a heat exchanger utilising a pipe connection arrangement. The pipe connection arrangement includes: a metallic block fitting; a flange for coupling to the block fitting; and a seal. The block fitting includes a bore extending therethrough for receiving a pipe for connection to a heat exchanger and the flange includes a bore extending therethrough for receiving the pipe. The block fitting includes a surface that faces the flange when the flange is coupled to the block fitting. The seal is configured for location between and for abutting both the surface of the block fitting and an annular collar of a pipe when it is connected by the pipe connection arrangement. The pipe extends through the bore of the flange and the flange is coupled to the block fitting.

18 Claims, 7 Drawing Sheets

(56) References Cited

U.S. PATENT DOCUMENTS

| | | | | |
|---|---|---|---|---|
| 4,493,297 A | * | 1/1985 | McIlwain | H01T 13/50 |
| | | | | 219/270 |
| 5,163,716 A | * | 11/1992 | Bolton | F25B 41/40 |
| | | | | 285/137.11 |
| 5,224,537 A | * | 7/1993 | Potier | F28F 9/0256 |
| | | | | 165/149 |
| 5,271,460 A | * | 12/1993 | O'Brien | F28F 9/0251 |
| | | | | 165/178 |
| 5,354,101 A | | 10/1994 | Anderson, Jr. | |
| 5,417,588 A | * | 5/1995 | Olson | H01R 13/424 |
| | | | | 439/585 |
| 5,711,370 A | * | 1/1998 | Tanaka | F28F 9/0251 |
| | | | | 165/178 |
| 6,471,249 B1 | * | 10/2002 | Lewis | F16L 27/12 |
| | | | | 285/31 |
| 8,360,476 B2 | | 1/2013 | Barden et al. | |
| 2005/0023828 A1 | * | 2/2005 | Takeuchi | F25B 41/40 |
| | | | | 285/368 |
| 2005/0275219 A1 | * | 12/2005 | Hiyama | F28F 9/0256 |
| | | | | 285/205 |
| 2007/0205566 A1 | | 9/2007 | Ragsdale et al. | |
| 2012/0228862 A1 | * | 9/2012 | Sullivan | F01D 25/26 |
| | | | | 285/41 |
| 2019/0063607 A1 | * | 2/2019 | Kesler | F28F 9/0248 |
| 2019/0093946 A1 | * | 3/2019 | Krishnamurthy | F25J 1/0055 |
| 2023/0253702 A1 | * | 8/2023 | Bhattacharya | H01Q 21/061 |
| | | | | 343/841 |

FOREIGN PATENT DOCUMENTS

| | | |
|---|---|---|
| EP | 3561239 A1 | 10/2019 |
| EP | 3670990 A1 | 6/2020 |
| KR | 101409165 B1 | 7/2014 |
| WO | 2009070162 A1 | 6/2009 |

\* cited by examiner

PIPE CONNECTION ARRANGEMENT FOR A HEAT EXCHANGER

CROSS-REFERENCE TO RELATED APPLICATIONS

This application claims the benefit of European Application No. 20171435.9 filed Apr. 24, 2020, the disclosure of which is incorporated herein by reference in its entirety.

FIELD

The present disclosure relates generally to the field of heat exchangers. In particular, the disclosure relates to a pipe connection arrangement for a heat exchanger, a heat exchanger comprising the pipe connection arrangement and a method of connecting a pipe to a heat exchanger.

BACKGROUND

Heat exchangers, in particular Micro Channel Heat Exchangers (MCHE), such as those used in air-cooled chillers, rely on the supply of refrigerant via a refrigerant pipe connected to the heat exchanger. Such a refrigerant pipe is typically made from copper. Conventionally, a refrigerant pipe is connected to a heat exchanger using a block fitting arrangement comprising an aluminium seal washer block heat exchanger fitting (referred to more generally as a block fitting) and a steel flange. Such a conventional pipe connection arrangement is described in more detail later with reference to FIG. 1. A conventional arrangement is also discussed in WO 2009/070162.

However, such pipe connections are susceptible to galvanic corrosion for various reasons. Firstly, a recessed area in the block fitting (also known as a spotfacing) in which a seal and a collar of the refrigerant pipe are located causes water retention, which leads to galvanic corrosion between the aluminium block fitting, steel flange and copper pipe due in particular to the high potential between the aluminium and copper. Additionally, the seal has a metallic (typically steel) part which is in contact with the collar of the copper refrigerant pipe and aluminium block fitting, thus providing electrical connection therebetween. Moreover, the collar of the pipe is in direct contact with the steel flange and the aluminium block fitting is in direct contact with the steel flange. These electrical connections result in further galvanic corrosion between the copper pipe and the aluminium block fitting, and between the steel flange and the aluminium block fitting. The galvanic corrosion causes damage to the pipe connection arrangement leading to refrigerant leaks. Moreover, the block fitting becomes unsightly.

The present inventors have recognised that there is a need to reduce galvanic corrosion in pipe connection arrangements for heat exchangers.

BRIEF DESCRIPTION

According to a first aspect, the present disclosure provides a pipe connection arrangement for a heat exchanger, the pipe connection arrangement comprising: a metallic block fitting; a flange for coupling to the block fitting; and a seal; wherein the block fitting includes a bore extending therethrough for receiving a pipe for connection to a heat exchanger; the flange includes a bore extending therethrough for receiving the pipe; the block fitting includes a surface that faces the flange when the flange is coupled to the block fitting; and the seal is configured for location between and for abutting both the surface of the block fitting and an annular collar of the pipe when it is connected by the pipe connection arrangement; wherein the seal includes a metallic ring and an annular rim of electrically insulating material radially outward of the metallic ring.

Typically, the block fitting includes aluminium, but may also comprise magnesium, bronze, titanium or alloys thereof. The flange is typically a metallic flange and may comprise steel or stainless steel. Alternatively the flange may comprise a plastic composite. A pipe for connection by the pipe connection arrangement may typically be a copper pipe or a steel pipe.

The flange provides a means to secure a pipe to be connected when it is inserted in the bore of the block fitting. The collar of the pipe will be sandwiched between (i.e. located between) the block fitting and the flange, and thus the flange prevents the pipe from slipping out of position. The flange will generally abut the collar when coupled to the block fitting.

It will be appreciated that since a surface of the block fitting faces the flange when the flange is coupled to the block fitting, it may also be considered that this surface of the block fitting is opposed to the flange. The flange may have a surface and the said surface of the block fitting may face, in other words be opposed to, this surface of the flange. The surface of the block fitting that faces the flange may abut the flange when the flange is coupled to the block fitting, or it may be spaced apart therefrom.

The seal may generally be an annular seal. When the flange is coupled to the block fitting the seal is typically located between the block fitting and the flange. The seal may alternatively be termed a gasket. The seal is for sealing around a pipe connected by the pipe connection arrangement in order to prevent fluid leaking out of the block fitting.

Since the seal includes an annular rim of electrically insulating material radially outward of the metallic ring, the diameter of the seal is increased when compared with prior art seals comprising only metallic rings. Due to this increase in diameter, the distance in terms of the gap between a collar of a pipe being connected and the block fitting, i.e. the open pathway between the two, is increased, thereby reducing galvanic corrosion. The difference between the outer diameter and inner diameter of the annular rim may be in the range of 2.0 mm to 10.0 mm. The difference may be 4.5 mm.

In addition, an annular rim of electrically insulating material may be provided radially inward of the metallic ring.

Optionally, the metallic ring of the seal is fully encapsulated within, i.e. overmoulded with, an electrically insulating material. The annular rim may be in addition to the encapsulation. Or, the annular rim may be a part of the encapsulation of the metallic ring within the electrically insulating material. It will be appreciated that by encapsulating the metallic ring in electrically insulating material, this inherently therefore includes an annular rim of said material radially outward of the metallic ring. The metallic part of the seal is therefore prevented from contacting the metallic block fitting, the flange, or a pipe being connected by the arrangement. Consequently, the metallic part of the seal is electrically insulated from the aluminium block fitting, thus reducing or avoiding galvanic corrosion between the two. Furthermore, since in use the seal is disposed between the collar of the pipe being connected and the block fitting, the electrical insulation provided by the seal therefore reduces galvanic corrosion between the collar and the block fitting. As a result, galvanic corrosion is reduced and thus damage caused by galvanic corrosion is also reduced.

Furthermore, since by encapsulating the metallic ring within an electrically insulating material the thickness and diameter of the seal is increased beyond that of a seal with no encapsulation, the distance between the flange and the block fitting is increased and the distance between the collar of a pipe being connected and the block fitting is increased. This increase in distance (i.e. separation of these components) further reduces galvanic corrosion. Regarding the increase in distance between the collar and the block fitting, this is not just the direct distance between these elements (increased as a result of the thickness of the encapsulation above and below the metallic ring). This is also an increase in the gap between the edge of the collar and the block fitting, i.e. the open pathway between the two, as a result of the encapsulation at the outer annular rim of the metallic ring.

The metallic ring of the seal may comprise steel. The electrically insulating material of the seal will generally be flexible. This electrically insulating material, i.e. the material of the annular rim and/or the encapsulation, may be a non-metallic material. Typically, it may comprise an elastic material such as an elastic polymer (elastomer) or a rubber material. Examples of suitable materials include natural or synthetic rubber, such as EPDM.

The seal may have an outer diameter (including the annular rim with or without optional encapsulation) in the range of 10.0 mm to 50.0 mm. The seal may have a thickness (including any encapsulation) in the range of 1.0 mm to 5.0 mm. In one example, the outer diameter is 30 mm and the thickness is 1.7 mm. In another example, the outer diameter is 35 mm and the thickness is 1.97 mm. The outer diameter may be at least 30 mm.

For example the metallic ring may have an outer diameter of 25.5 mm and an inner diameter of 21 mm and the annular rim (which may be part of a full encapsulation) may have an outer diameter of 30 mm and an inner diameter of 25.5 mm Therefore, when the annular rim is added to the metallic ring, the seal may have an outer diameter of 30 mm and an inner diameter of 21 mm. It will be appreciated that if the metallic ring is fully encapsulated in electrically insulating material then the inner diameter of the seal will be smaller than the inner diameter of the metallic ring due to the presence of electrically insulating material at the inner circumference of the metallic ring and the thickness of the seal will be greater than the thickness of the metallic ring due to the presence of electrically insulating material at the top and bottom of the metallic ring.

The seal may be configured for location between and for abutting both the surface of the block fitting that faces the flange and the annular collar of the pipe when the pipe extends through the bore of the flange and into the bore of the block fitting and the flange is coupled to the block fitting.

In other words, the seal is one which is configured to be located between the surface of the block fitting opposite the flange and an annular collar of a pipe being connected by the pipe connection arrangement when the pipe has been inserted through the bore of the flange and into the bore of the block fitting. Thus, in use, when a pipe is connected by the pipe connection arrangement and thus extends through the bore of the flange and into the bore of the block fitting, the seal is located between and abuts both of the surface of the block fitting and an annular collar of the pipe. The seal may therefore be considered as being located or seated on the surface of the block fitting and/or as being located adjacent to the collar.

Optionally, the surface of the block fitting which the seal abuts in use (i.e. the surface of the block fitting that faces the flange when the flange is coupled to the block fitting) is flat, and therefore the recessed area (i.e. the spot facing) of the prior art is omitted. In other words, in this embodiment the seal of the present disclosure is not located within a recess in the surface of the block fitting as in the prior art. Consequently, water retention in the recessed area as occurs in the prior art is avoided. Thus, galvanic corrosion is reduced and the damage resulting from such corrosion is reduced. Moreover, since in use the seal is seated on a flat facing rather than within a recessed area, a gap is created or increased between the block fitting and the flange when the flange is coupled to the block fitting, thereby further reducing galvanic corrosion.

Optionally, the surface of the block fitting opposite to (i.e. which faces) the flange when the flange is coupled to the block fitting includes a plateau portion surrounding the bore and extending towards the flange. In this case, the seal may be configured for location between and for abutting both the plateau portion and an annular collar of a pipe when it is connected by the pipe connection arrangement.

In other words, the seal is one which is configured to be located between the plateau portion and an annular collar of a pipe being connected by the pipe connection arrangement when the pipe has been inserted through the bore of the flange and into the bore of the block fitting. Thus, in use, when a pipe is connected by the pipe connection arrangement and thus extends through the bore of the flange and into the bore of the block fitting, the seal is located between and abuts both of the plateau portion and an annular collar of the pipe. The seal may therefore be considered as being located or seated on the plateau portion and/or as being located adjacent to the collar.

Since in this embodiment, in use, the seal is seated on the plateau portion, it is not located on the lowest part of a recessed area (i.e. spot facing) as in the prior art.

In this embodiment wherein the surface of the block fitting includes the plateau portion, the plateau portion is therefore part of the block fitting that projects outwards from a main body of the block fitting. The plateau portion may extend in an axial direction of the bore. The plateau portion may extend towards the flange when the flange is coupled to the block fitting. The height of the plateau portion may be a height relative to an area of the block fitting from which the plateau portion projects. For example, the height relative to the surrounding surface of the block fitting. The plateau portion may have a height up to about 20 mm Or, the plateau portion may have a height up to about 8 mm. It will be appreciated that the plateau portion height may be greater than zero. For example, the plateau portion may have a height greater than zero but less than or equal to 8 mm. In another example the plateau portion may have a height greater than zero but less than or equal to 20 mm.

The plateau portion may be understood as being "embossed" on the surface of the block fitting. The plateau portion may typically be formed as part of the block fitting, i.e. it may be continuous with the block fitting and formed of the same material.

The plateau portion may have an annular shape surrounding the bore of the block fitting. The plateau portion may have approximately the same diameter or other dimensions as the seal.

In some examples the surface of the block fitting that faces the flange when the flange is coupled to the block fitting may be stepped. In other words the surface may be understood as comprising at least one step, or as having a stepped shape. The stepped surface may comprise at least one upper portion and at least one lower portion in addition to the optional plateau portion. The upper portion may be the portion of the surface that is closer to the flange than the lower portion when the flange is coupled to the block fitting, and the lower portion may be the portion of the surface that is further away from the flange than the upper portion when the flange is coupled to the block fitting. The optional plateau portion may project from the lower portion of the surface. The lower portion may be flat or substantially flat except for an optional plateau portion that extends therefrom.

A depth of the step may be understood to be the distance between the upper portion and the lower portion of the surface. The step may have a depth within a range of about 0 to about 20 mm, for example within a range of 0 to 20 mm. The depth may be within a range of about 0 to about 8 mm, for example within a range of 0 to 8 mm. The height of an optional plateau portion may be a height relative to the lower portion of the surface. The plateau portion may have a height that is equal to or less than the depth of the step. The surface may comprise two upper portions and one lower portion located between the upper portions. The lower portion may be joined to each upper portion by a step. The surface of a stepped block fitting may be flat or substantially flat except for the step and an optional plateau portion.

Although water may accumulate in the lower portion of the surface, if the seal is located on a plateau portion that projects from the lower portion of the surface, the seal is located away from water that may have accumulated at the lowest point of the lower portion. Additionally, the collar of the pipe that abuts the seal may be caused to be located further away from the retained water due to a plateau portion. Thus, galvanic corrosion is reduced and the damage resulting from such corrosion is reduced.

In other examples the surface of the block fitting may be flat or substantially flat; or flat or substantially flat except for the plateau portion; i.e. the spotfacing/recessed area of the prior art may be omitted. Consequently, water retention in the recessed area as occurs in the prior art is avoided. Thus, galvanic corrosion is reduced and the damage resulting from such corrosion is reduced.

The pipe connection arrangement may further comprise at least one fastener for coupling the flange to the block fitting. The fastener may comprise a bolt, typically a steel or stainless steel bolt, and the block fitting may comprise a hole for receiving the bolt. In examples where the surface of the block fitting is stepped, the hole may be extend into the upper portion of the surface. The bolt may comprise an external screw thread, and the hole may comprise an internal screw thread corresponding to the screw thread of the bolt such that the bolt can be screwed therein. The bolt may be a stud bolt. The bolt may be configured to receive a nut on one end of the bolt. The fastener may comprise the combination of a bolt and a nut.

The flange may comprise a hole for receiving the fastener, e.g. a bolt, which may be an unthreaded hole. The hole of the flange and/or the block fitting may be tapered at the opening (s) thereof which may aid insertion of the fastener into the hole. The tapered opening of the hole of the flange and/or the block fitting may be a countersink. In embodiments where the surface of the block fitting is substantially flat except for a plateau portion and the seal abuts the plateau portion, the meaning of "substantially flat" is intended to include a surface comprising tapered portions at the openings of one or more holes for receiving the bolt(s). In other words, the surface is flat except for the tapering at the opening(s) and the plateau portion. Such tapering has a minimal overall impact on the shape of the surface and hence can be considered as falling within the meaning of "substantially flat". Similarly, in embodiments where the surface of the block fitting includes a stepped portion and a plateau portion but is otherwise substantially flat, and the seal abuts the plateau portion, the meaning of "substantially flat" is intended to include a surface comprising tapered portions at the openings of one or more holes for receiving the fastener (s). Again, such tapering has a minimal overall impact on the shape of the surface and thus can be considered as falling within the meaning of "substantially flat". It may also be considered as falling within the scope of the meaning of "flat".

In another embodiment, the bolt may be replaced with a screw.

Typically, two fasteners are provided for a single block fitting. The fasteners may be arranged on opposite sides of the bore.

The arrangement may further comprise a pipe extending through the bore of the flange and into the bore of the block fitting (e.g. a pipe for connection by the pipe connection arrangement). The flange may be coupled to the block fitting. The pipe is typically a refrigerant supply pipe and as mentioned above may comprise copper or steel. The pipe may comprise an annular collar which is located between the block fitting and the flange and abuts the seal. The seal may abut the surface of the block fitting opposite the flange. In other words, the seal may be located between the surface of the block fitting facing the flange and the collar, and the lower surface of the seal abuts the surface of the block fitting and an upper surface of the seal (the surface furthest from the block fitting) abuts the collar.

In embodiments in which the block fitting includes a plateau portion, the seal may abut the plateau portion. In other words, the seal may be located between the plateau portion and the collar, and a lower surface of the seal abuts the plateau portion and an upper surface (the surface furthest from the block fitting) abuts the collar.

A gap may be defined between the block fitting and the flange.

Where there is no plateau portion, a gap may be defined between the surface of the block fitting surrounding the seal and the flange, which has a dimension substantially equal to a thickness of the seal summed with a thickness of the annular collar. Alternatively, when the surface is stepped, a gap between the upper portion(s) of the surface of the block fitting facing the flange and the flange has a dimension substantially equal to the thickness of the seal summed with a thickness of the annular collar, minus the depth of the step. If the depth of the step is greater than or equal to the thickness of the seal summed with a thickness of the annular collar, then there will be no gap and the upper portion(s) of the surface of the block fitting will abut the flange.

When a plateau portion is present a gap may be defined between the surface of the block fitting surrounding the plateau portion and the flange. In embodiments where the surface of the block fitting is flat or substantially flat except for a plateau portion on which the seal is located, the gap has a dimension substantially equal to a thickness of the seal summed with a thickness of the annular collar and the height of the plateau portion.

In embodiments where the surface is stepped, a gap between the upper portion(s) of the surface of the block fitting facing the flange and the flange has a dimension substantially equal to a thickness of the seal summed with a thickness of the annular collar and the height of the plateau portion, minus the depth of the step. If the depth of the step is greater than or equal to the thickness of the seal summed with a thickness of the annular collar and the height of the plateau, then there will be no gap and the upper portion(s) of the surface of the block fitting will abut the flange.

The block fitting may comprise a body including a block portion and an insert portion. The block portion may be configured to reside above an exterior surface of a heat exchanger, this block portion comprising the surface that faces the flange. The insert portion may be configured for being received in a heat exchanger and being fluidically coupled thereto. The bore of the block fitting may extend from the surface, through the block portion and through the insert portion to an opening in a lower surface of the insert portion. Thus, the pipe connection arrangement allows fluid to pass through a pipe into or out of a heat exchanger via the opening in the insert portion.

The arrangement may further comprise a pipe extending through the bore of the flange and into the bore of the block fitting (e.g. a pipe for connection by the pipe connection arrangement). The flange may be coupled to the block fitting. The pipe is typically a refrigerant supply pipe and as mentioned above may comprise copper or steel. The pipe may comprise an annular collar which is located between the block fitting and the flange and abuts the seal. The seal may abut the surface of the block fitting that faces the flange. In other words, the seal may be located between the surface of the block fitting opposite (facing) the flange and the collar, and the lower surface of the seal abuts the surface of the block fitting and an upper surface of the seal (the surface furthest from the block fitting) abuts the collar.

In embodiments in which the block fitting includes a plateau portion, the seal may abut the plateau portion. In other words, the seal may be located between the plateau portion and the collar, and a lower surface of the seal abuts the plateau portion and an upper surface (the surface furthest from the block fitting) abuts the collar.

In another aspect, the disclosure provides a heat exchanger comprising a pipe connection arrangement according to any aspect or embodiment described above. The heat exchanger may further comprise a pipe connected by the pipe connection arrangement. The pipe may extend through the bore of the flange and into the bore of the block fitting. The bore of the block fitting may generally be fluidically connected with an opening of the heat exchanger, such that fluid can pass through a pipe coupled with the bore of the block fitting into or out of the heat exchanger. The flange may be coupled to the block fitting.

The pipe may comprise an annular collar, wherein one side of the seal abuts the surface of the block fitting facing the flange and another side of the seal abuts the annular collar. In other words, the seal may be located between the surface of the block fitting and the collar, and a lower surface of the seal abuts the surface of the block fitting and an upper surface of the seal (the surface furthest from the block fitting) abuts the collar.

In one embodiment the block fitting may be integrally formed as part of the heat exchanger. For example, the block fitting may be cast with a portion of the heat exchanger. Alternatively, the block fitting may be formed as a separate element and subsequently attached to the heat exchanger, such as by welding and/or by brazing. Typically, the block fitting and the portion of the heat exchanger to which the block fitting is attached will be formed of the same material, such as aluminium.

The heat exchanger may be a microchannel heat exchanger (MCHE). Optionally, it may be a MCHE of an air cooled chiller. However alternatively the heat exchanger may be an aluminium coil heat exchanger or other type of heat exchanger.

Further, the disclosure extends to an air-cooled chiller comprising at least one heat exchanger in any of the forms described above.

It will be appreciated that in embodiments of the heat exchanger, the pipe connected by the pipe connection arrangement may be considered as part of the heat exchanger or part of the pipe connection arrangement of the heat exchanger.

In another aspect, the present disclosure provides a method of connecting a pipe to a heat exchanger utilising a pipe connection arrangement in any of the forms described above, wherein the bore of the block fitting is fluidically coupled with an opening of the heat exchanger; the method comprising the steps of: arranging the seal and inserting the pipe into the bore of the block fitting such that the seal is located between and abuts the annular collar of the pipe and the surface of the block fitting; and arranging the flange over the pipe so that the pipe extends through the bore of the flange and the flange abuts the annular collar of the pipe.

The step of arranging the seal may comprise arranging the seal on the pipe adjacent and/or abutting the annular collar of the pipe prior to inserting the pipe into the bore of the block fitting. It will be appreciated that the seal is arranged adjacent to/abutting a surface of the annular collar of the pipe closest to the heat exchanger to which it is being connected. This may be considered the lower surface of the annular collar. Alternatively, the step of arranging the seal may comprise arranging the seal on the surface of the block fitting prior to inserting the pipe into the bore of the block fitting.

In an embodiment in which the surface of the block fitting includes a plateau portion, it will be appreciated that the step of arranging the seal and inserting the pipe into the bore of the block fitting such that the seal is located between and abuts the annular collar of the pipe and the surface of the block fitting includes arranging the seal and inserting the pipe into the bore of the block fitting such that the seal is located between and abuts the annular collar of the pipe and the plateau portion of the block fitting. Similarly, the step of arranging the seal may comprise arranging the seal on the plateau portion of the block fitting prior to inserting the pipe into the bore of the block fitting.

The method may include coupling the flange to the block fitting, optionally using a fastener. The method may include inserting a fastener through the flange and into the block fitting.

It will be appreciated that optional features described in relation to certain embodiments and aspects described above are equally applicable to other embodiments and aspects of the invention.

BRIEF DESCRIPTION OF THE DRAWINGS

Certain preferred embodiments of the present disclosure will now be described, by way of example only, with reference to the following drawings, in which.

DETAILED DESCRIPTION

Figure 1:
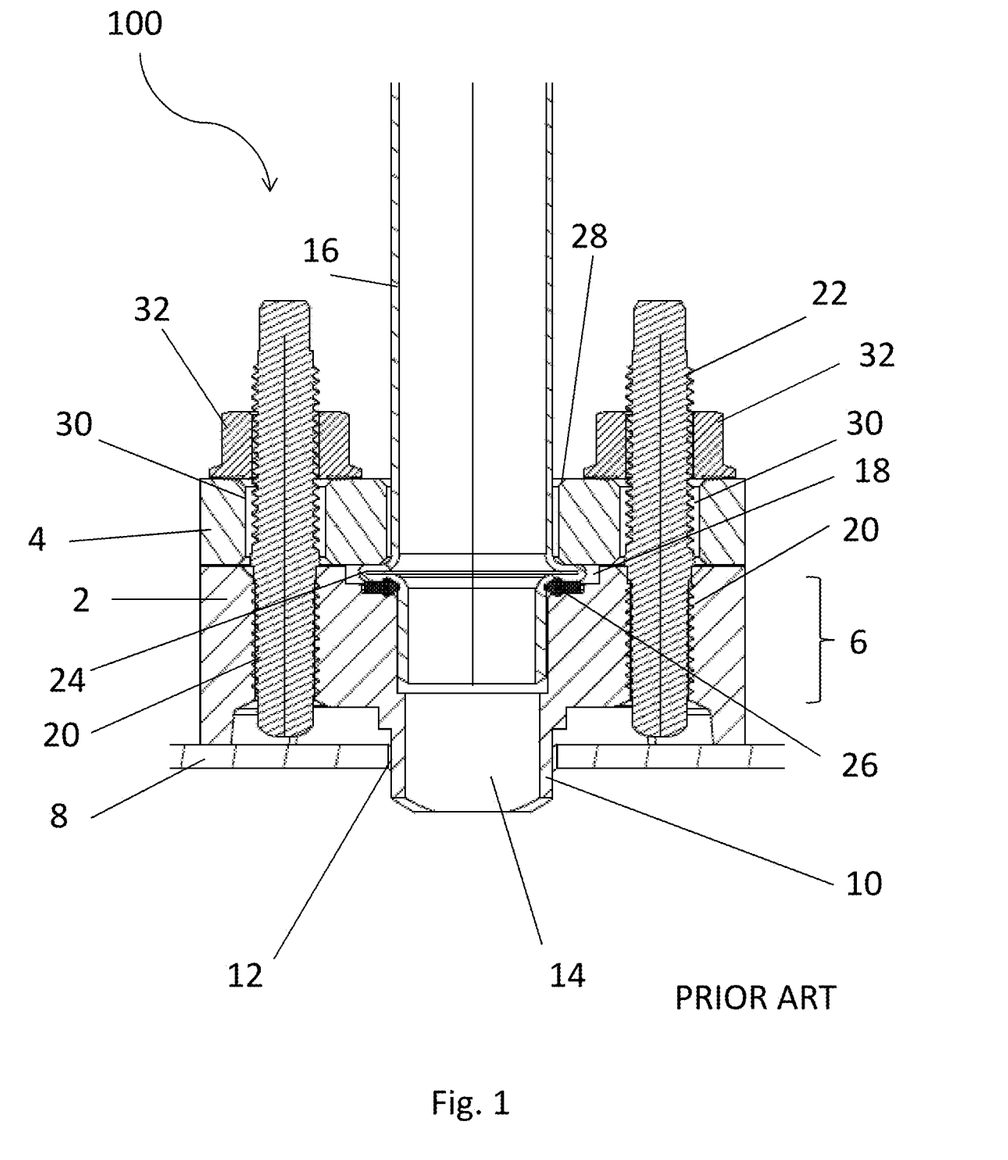
FIG. 1 is a cross-sectional diagram of a conventional pipe connection for an MCHE.

FIG. 1 shows a conventional pipe connection 100 which may be an inlet and/or an outlet connection for a MCHE. The pipe connection 100 includes a block fitting 2 and a metal flange 4. The block fitting 2 includes a body having a block portion 6 that resides above the exterior surface of a heat exchanger 8 and an insert portion 10 having an outer diameter that is received in the heat exchanger 8. The outer diameter of the insert portion 10 is sized in correspondence with an opening 12 in the heat exchanger 8.

The block fitting 2 includes a bore 14 which has an opening in and extends from a surface of the block portion 6 that faces the flange 4 when the flange 4 is coupled to the block fitting 2. The bore 14 extends from the surface, through the block fitting 2, to an opening in a lower surface of the insert portion 10. A refrigerant pipe 16 extends partially inside the bore 14. The block fitting 2 thus allows refrigerant to pass through the refrigerant pipe 16 into or out of the heat exchanger 8.

The block fitting 2 is made from aluminium, the refrigerant pipe 16 is a copper tube, and the metal flange 4 is a steel flange.

The surface of the block portion 6 includes a recessed area 18 located between two threaded holes 20. The threaded holes 20 have tapered openings. Each threaded hole 20 receives a bolt 22. The refrigerant pipe 16 includes a pipe collar 24 positioned at a predefined distance from the end of the refrigerant pipe. The refrigerant pipe 16 extends into the bore 14 of the block fitting 2 such that the collar 24 is received in the recessed area 18. A seal 26 is disposed in the recessed area 18 between the block fitting 2 and a lower surface of the collar 24. The seal 26 includes an annular metallic part arranged concentrically with and radially outward of an annular rubber part.

The metal flange 4 abuts the surface of the block portion 6. The metal flange 4 includes a bore 28 extending therethrough and two holes 30. The metal flange 4 is positioned relative to the block fitting 2 such that the bore 28 of the metal flange 4 aligns with the bore 14 of the block fitting 2, and the holes 30 of the metal flange 4 align with the threaded holes 20 of the block fitting 2. The refrigerant pipe 16 extends through the bore 28 of the metal flange 4 and the bore 14 of the block fitting 2 such that the collar 24 is disposed between the metal flange 4 and the block fitting 2. The metal flange 4 contacts the collar 24 of the refrigerant pipe 16 and applies a force thereto such that the collar 24 compresses the seal 26 between the block portion 6 and the collar 24 to form a leak-proof connection between the refrigerant pipe 16 and the block fitting 2.

Each bolt 22 extends through a hole 30 of the metal flange 4 and a corresponding threaded hole 20 of the block fitting 2. A nut 32 is disposed on each bolt 22 to secure it therein.

The recessed area 18 has a depth sufficient to receive the seal 26 and the collar 24 such that the metal flange 4 seated on the collar 24 abuts the block fitting 2. As described previously, this conventional pipe connection 100 has a problem in that the recessed area 18 can cause water retention which leads to galvanic corrosion between the metallic components, and in particular the aluminium, steel and copper components. Additionally the metallic part of the seal 26 is in contact with the collar of the metallic refrigerant pipe 16 and is positioned close to the metallic block fitting 2 causing further galvanic corrosion.

Figure 2:
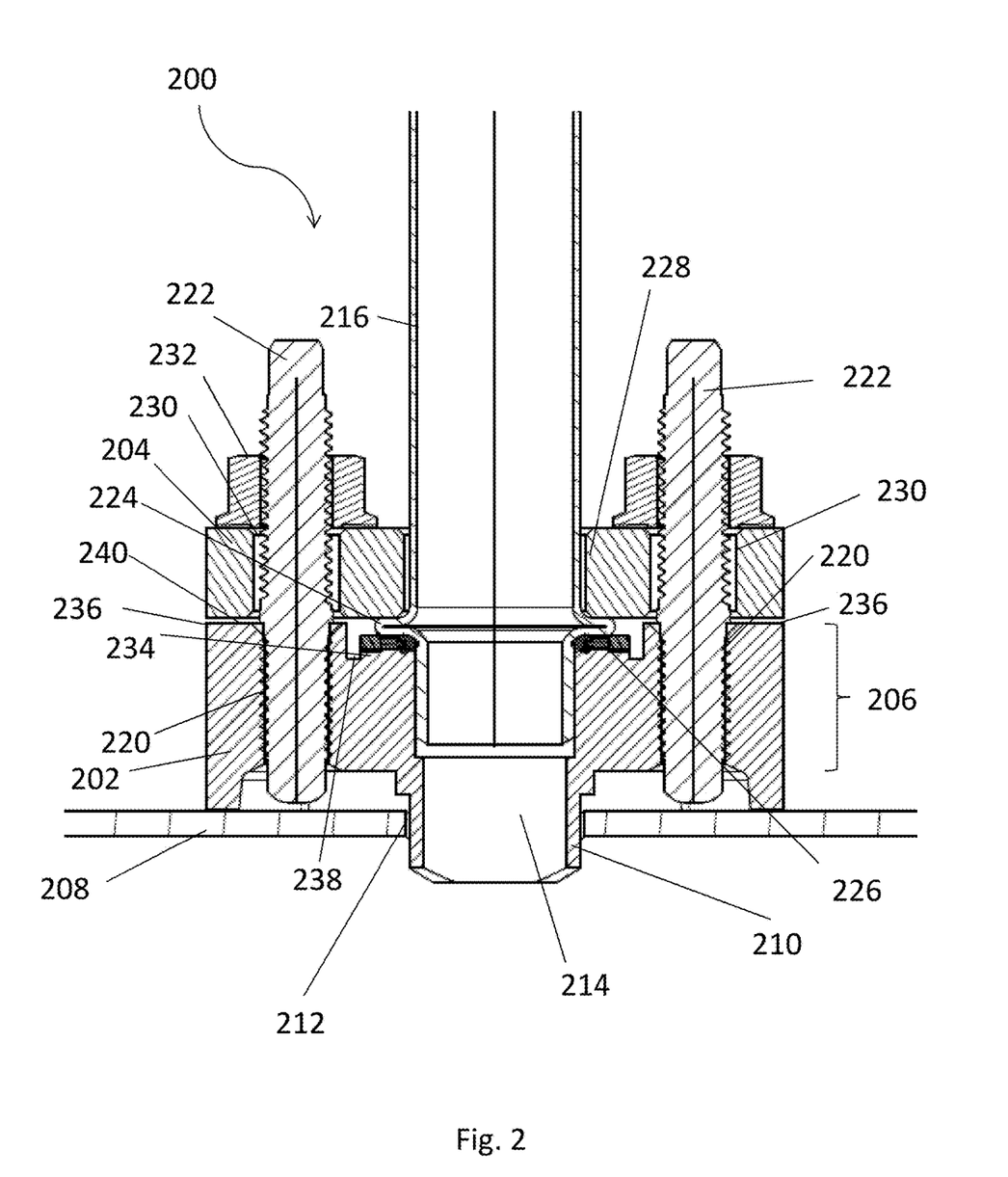
FIG. 2 is a cross-sectional diagram of a pipe connection arrangement with a block fitting for a MCHE with a pipe connected therein according to an embodiment of the disclosure.
Figure 3A:
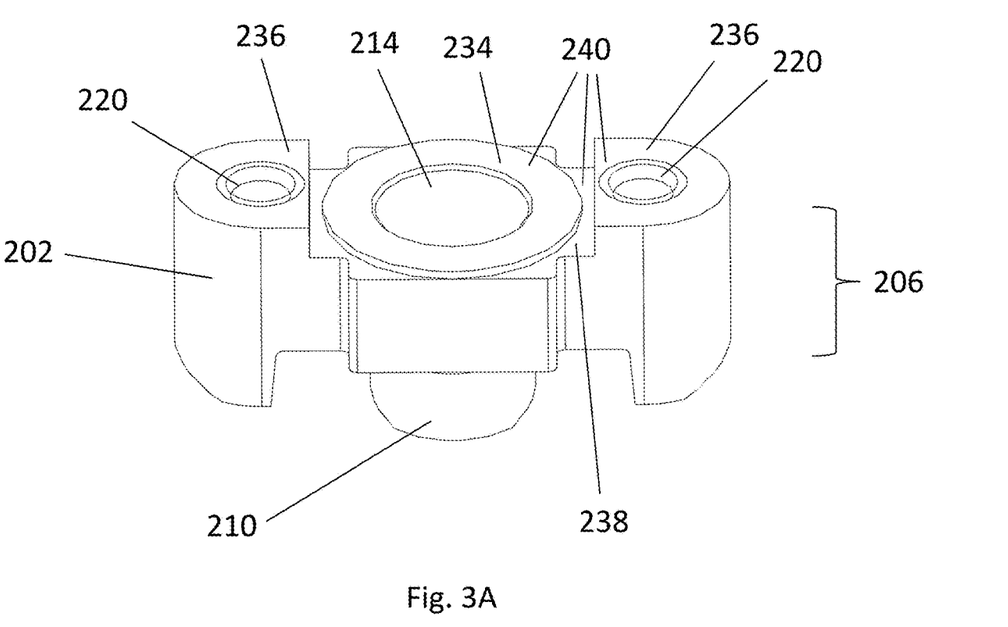
FIG. 3A is a perspective view of the block fitting of the pipe connection arrangement of FIG. 2 having a stepped surface comprising a plateau portion.
Figure 3B:
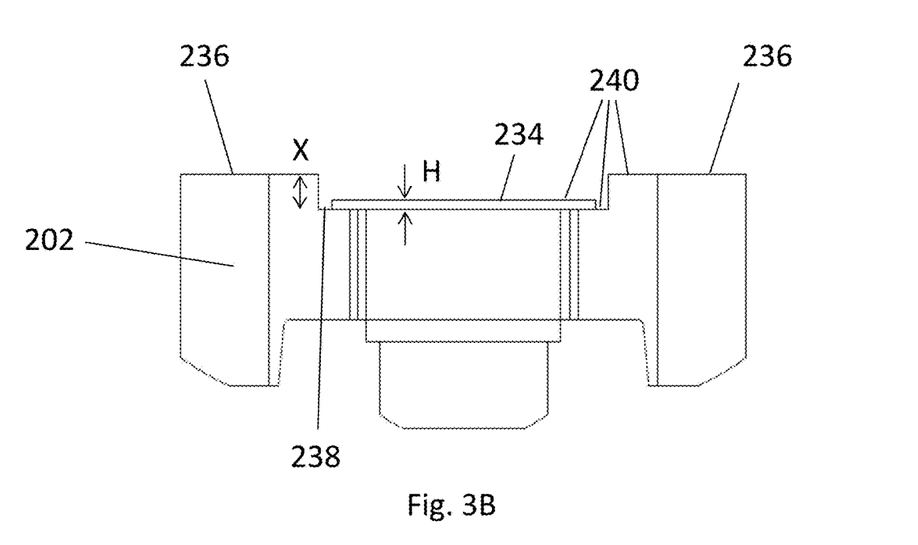
FIG. 3B is a side view of the block fitting of FIG. 3A.

FIG. 2 shows a pipe connection arrangement 200 according to an embodiment of the disclosure. The pipe connection arrangement 200 includes a block fitting 202 and a piping flange, in this case a metal flange, 204. The metal flange 204 has the same structure as metal flange 4. Similarly to block fitting 2, block fitting 202 has a body including a block portion 206 that resides above the exterior surface of a heat exchanger 208 and an insert portion 210 having an outer diameter that is received in the heat exchanger 208. The outer diameter of the insert portion 210 is sized in correspondence with an opening 212 on the heat exchanger 208. Block fitting 202 includes a bore 214 which has an opening in and extends from a surface 234, 236, 238 of the block portion 206 that faces the flange 204 when the flange 204 is coupled to the block fitting 202. The portions 234, 236, 238 of the surface will be referred to collectively as surface 240, as shown in FIGS. 3A-3B. The bore 214 extends from the surface 240, through the block fitting, to an opening in a lower surface of the insert portion 210. A refrigerant tube 216 extends partially inside the bore 214. The fitting 202 thus allows refrigerant to pass through the refrigerant tube 216 into or out of the heat exchanger 208.

The block fitting 202 includes a metallic material, for example aluminium. The refrigerant pipe also includes a metallic material, for example copper. The metal flange may be a steel flange.

The block portion 206 includes two threaded holes 220 each configured to receive a bolt 222. The threaded holes 220 have a minor amount of tapering at the openings thereof. This tapering is negligible, such that the portions 236 of the surface may be considered as substantially flat.

The refrigerant pipe 216 includes a pipe collar 224 (also simply termed a "collar" in this specification) positioned at a predefined distance from the end of the refrigerant pipe. The pipe connection arrangement 200 further includes an annular seal 226 disposed between the fitting 202 and the collar 224. The structure of the seal 226 will be described in more detail below.

The block fitting 202 has a surface 240 that faces the flange 204. The surface 240 is stepped and includes two upper portions 236, a lower portion 238 and a plateau portion 234. The upper portions 236 are closer to the flange 204 than the lower portion 238. A step joins each upper portion to the lower portion. The block fitting 202 is shown in more detail in FIG. 3 which will be described later.

The block portion 206 differs from block portion 6 in that block portion 206 has the plateau portion 234. The plateau portion 234 projects from the lower portion 238 towards the flange 204. The plateau portion 234 can be seen more clearly in FIGS. 3A and 3B described below. The seal 226 is seated on the plateau portion 234. The collar is seated on the side of the seal 226 opposite the block fitting 202.

The metal flange 204 abuts the collar 224 on a side opposite to the side that contacts the seal 226. The metal flange 204 includes a bore 228 extending therethrough and two holes 230. The metal flange 204 is positioned relative to the block fitting 202 such that the bore 228 of the metal flange 204 aligns with the bore 214 of the block fitting 202, and the threaded holes 220 of the block fitting 202 align with the holes 230 of the metal flange 204. The bolts 222 extend through the holes 230 of the metal flange 204 and the corresponding threaded holes 220 of the block fitting 202. A nut 232 is disposed on each bolt 222 to secure it therein.

In practice, this means that the method of connecting the refrigerant pipe 216 to the heat exchanger 208 utilising the pipe connection arrangement 200 includes arranging the seal on the pipe such that the seal abuts the annular collar 224 of the pipe. The seal abuts the lower surface of the annular collar of the pipe relative to the heat exchanger 208, i.e. the surface of the annular collar which is closer to the heat exchanger 208. The pipe 216 is then inserted into the bore 214 of the block fitting 202 such that the side of the seal 226 opposite to that which abuts the annular collar is caused to abut the plateau portion 234 of the surface 240 of the block fitting 224. In other words, the seal is located between the plateau portion 234 and the annular collar 224.

Subsequently, the flange 204 is arranged over the pipe 216 so that the pipe extends through the bore 228 of the flange 204 and the flange 204 abuts the collar 224 of the pipe 216. The flange 204 is then coupled to the block fitting 202 by inserting the bolts 222 through the holes 230 in the metal flange 204 and the corresponding holes 220 in the block fitting 202.

Thus, the refrigerant pipe 216 extends through the bore 228 of the metal flange 204 and the bore 214 of the block fitting 202 such that the collar 224 is disposed between the metal flange 204 and the block fitting 202. The metal flange 204 contacts the collar 224 of the refrigerant pipe 216 and applies a force thereto such that the collar 224 compresses the seal 226 between the block fitting 202 and the collar 224 to form a leak-proof connection between the refrigerant pipe 216 and the block fitting 202.

Because the seal 226 is located on the plateau portion 234, the seal 226 and the collar 224 are raised above the lower portion 238 of the surface of the block fitting 202.

In the example shown in FIG. 2, the sum of the height of the plateau portion 234, the thickness of the seal 226 and the thickness of the collar 224 are roughly equal to the depth of the step, i.e. the distance between the upper portion 236 and the lower portion 238 of the surface 240. Therefore there is only a negligible gap between the flange 204 and the block fitting 202. In some examples, the sum of the height of the plateau portion 234, the thickness of the seal 226 and the thickness of the collar 224 may be greater than the depth of the step. In this case a gap is defined between the metal flange 204 and the block fitting 202. The gap has a width substantially equal to the sum of the thickness of the seal 226, the thickness of the collar 224 and the height of the plateau portion 234, minus the depth of the step.

FIGS. 3A and 3B show the block fitting 202 of the pipe connection 200 of FIG. 2. As described previously, the block fitting 202 has a block portion 206 and an insert portion 210, a bore 214, and two threaded holes 220 with small tapers at the openings. The bore 214 is configured to receive a refrigerant pipe. The threaded holes 220 are configured to receive bolts. The block fitting 202 includes the surface 240 that faces the flange when the flange is coupled to the block fitting 202. As described above, the surface 240 of the block fitting 202 in this example is stepped and includes two upper portions 236, a lower portion 238 and a plateau portion 234. The plateau portion 234 projects from the lower portion 238 of the surface 240. The plateau portion 234 has an annular shape and surrounds the bore 214. As shown in FIG. 3B, the plateau portion 234 has a height H and the step has a depth X, i.e. the distance between the upper portions 236 and the lower portion 238 is X. The depth X is greater than the height H in this example.

Figure 3C:
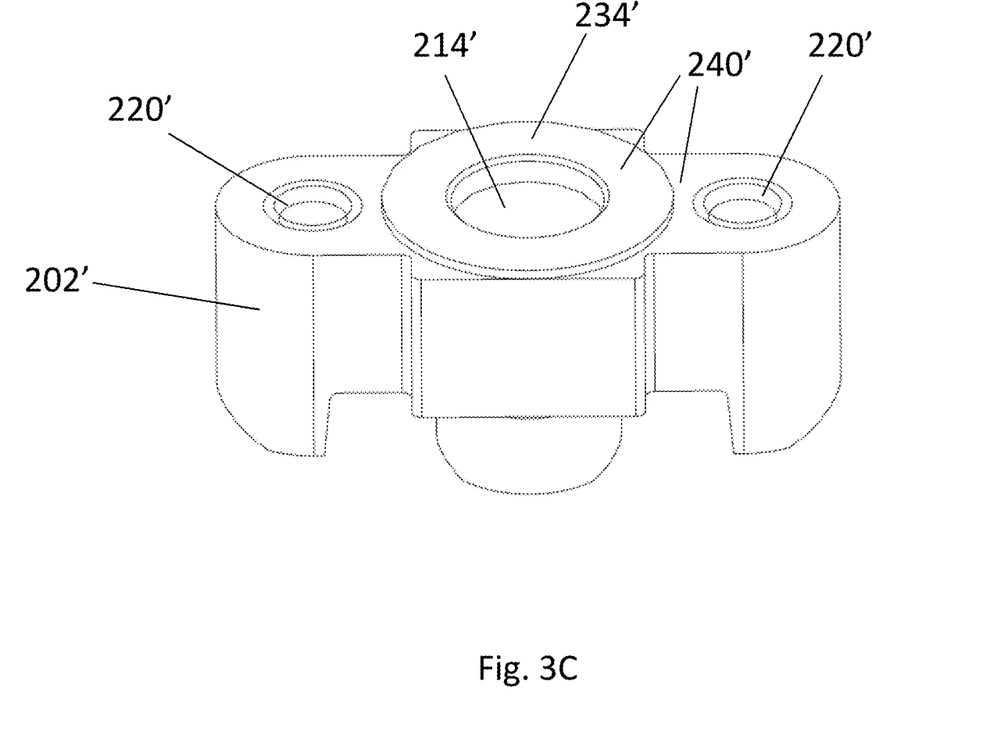
FIG. 3C is a perspective view of the block fitting of the pipe connection arrangement of FIG. 2 having a flat surface comprising a plateau portion.
Figure 3D:
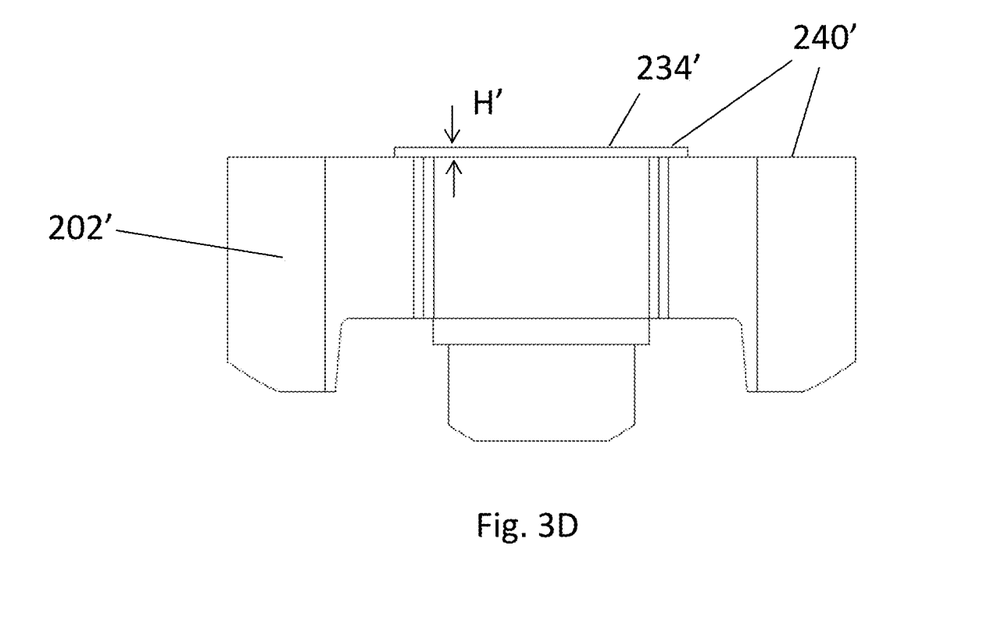
FIG. 3D is a side view of the block fitting of FIG. 3C.

In another embodiment a surface 240' of a block fitting 202' is flat or substantially flat except for a plateau portion 234', i.e. it does not have a stepped portion. A block fitting 202' according to this example is shown in FIGS. 3C and 3D. The surface 240' is flat except for the plateau portion 234' (and the negligible tapers at the openings of holes 220'). In other words, the surface 240' includes a plateau portion 234' and is otherwise substantially flat. When assembled as part of a pipe connection arrangement like the arrangement shown in FIG. 2, a gap will be defined between the metal flange 204 and the surface of the block fitting 202' surrounding the plateau portion 234'. The gap will have a width substantially equal to the sum of the thickness of the seal 226, the thickness of the collar 224 and the height H' of the plateau portion 234'.

Figure 4A:
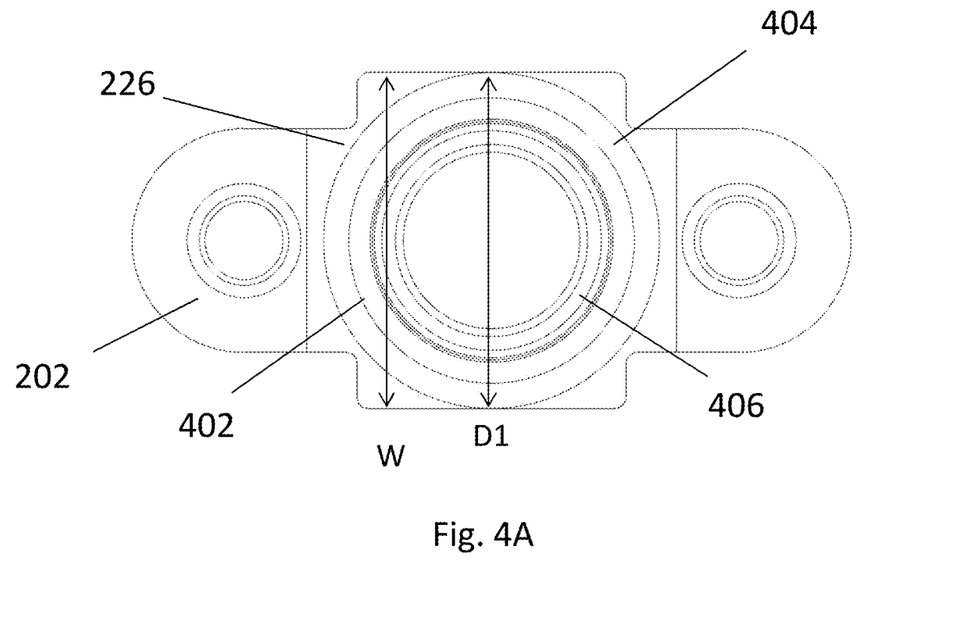
FIG. 4A is a top view of the block fitting of FIG. 3A with a seal arranged thereon.
Figure 4B:
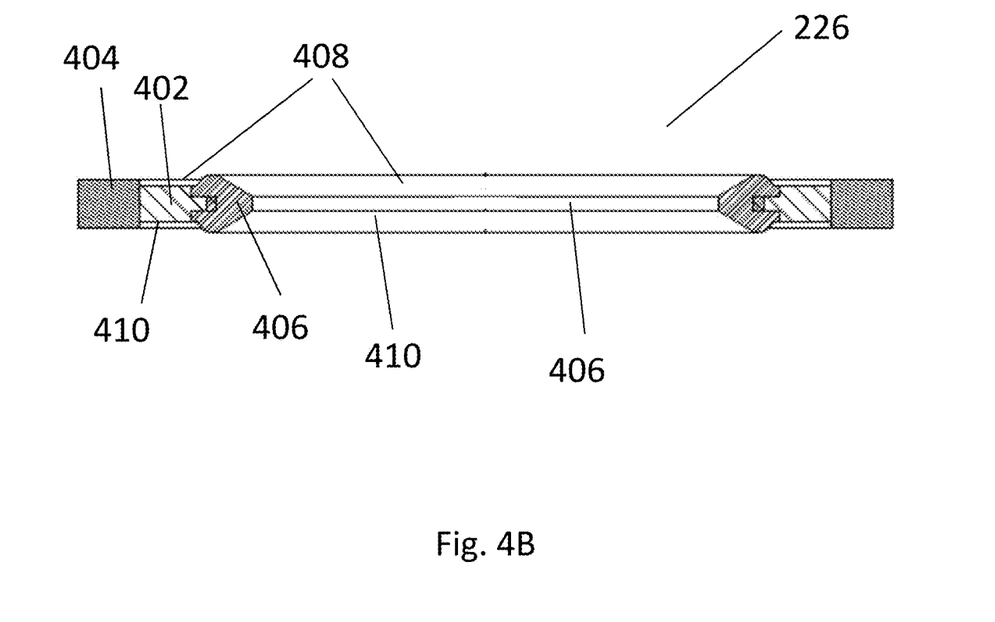
FIG. 4B is a side cross-sectional view of the seal of FIG. 2.

FIGS. 4A and 4B show examples of the structure of the seal 226 that may be used with embodiments of the pipe connection arrangement of the disclosure. FIG. 4A shows a top cross-sectional view of the seal 226 seated on the plateau portion 234 of the surface 240 of the block fitting 202, and FIG. 4B shows a side cross-sectional view of the seal 226. In each case, the seal 226 is an annular seal comprising an annular metal ring 402 and an annular electrically insulating part, which is an annular rubber part in this example.

In the example of FIG. 4A, the cross-section of the seal 226 shows that the annular rubber part of the seal 226 includes two annular rubber rings 404, 406. The first annular rubber ring 404 (which may be termed a "rim") is radially outward of the annular metal ring 402 and the second annular rubber ring 406 is radially inward of the annular metal ring 402. The inner diameter of the first annular rubber ring 404 is equal to the outer diameter of the annular metal ring 402, and the inner diameter of the annular metal ring 402 is equal to the outer diameter of the second annular rubber ring 406. Thus the annular metal ring 402 is in contact with the rubber part along its entire inner and outer circumference. The outer diameter D1 of the first annular rubber ring 404 is approximately equal to a width W of the block fitting 202. The inner diameter of the second annular rubber ring 406 is the same or minimally greater than an outer diameter of the refrigerant pipe 216 such that the refrigerant pipe 216 can extend through the annular seal 226 whilst the seal 226 seals around the refrigerant pipe 216.

As shown in FIG. 4B, the seal 226 in this example is over-moulded such that the annular metal part 402 is completely encased by rubber. In other words, not only is there rubber around the inner and outer circumference of the metal ring, but also over the top and bottom surfaces of the metal ring. Consequently, the metal ring 402 is entirely encapsulated within rubber. The rubber encapsulation includes the radially outward rubber ring (annular rim) 404, the radially inward rubber ring 406, an upper rubber ring 408 and a lower rubber ring 410.

Referring to FIG. 2 and FIGS. 4A and 4B, the radially outward rubber part 404 of the seal 226 increases a distance between the refrigerant pipe 216 and the block fitting 202. Specifically, there is an increased distance in terms of a gap between the collar 224 and the block fitting 202, i.e. the open pathway between the two is increased. Therefore there is a reduction in galvanic corrosion between the metallic refrigerant pipe 216 and the metallic block fitting 202.

Furthermore, as shown in FIG. 4B, because the metallic part 402 of the seal 226 is fully encased by the rubber part 404, 406, 408, 410, there is no direct contact between the metallic part 402 of the seal 226 and the metallic block fitting 202 or between the metallic part 402 of the seal 226 and the metallic refrigerant pipe 216, leading to a reduction in galvanic corrosion between the metallic components.

Additionally, because the seal 226 is located on a plateau portion 234 that projects from the lower portion 238 of the surface 240, the seal is located away from water that may accumulate in the lower portion 238. Additionally, the collar 224 of the pipe 216 that abuts the seal 226 is caused to be located further away from the retained water due to the plateau portion 234. Therefore there is a reduction in galvanic corrosion between the metallic collar 224, flange 204 and the metallic block fitting 202. Thus, damage resulting from such corrosion is reduced.

Figure 5:
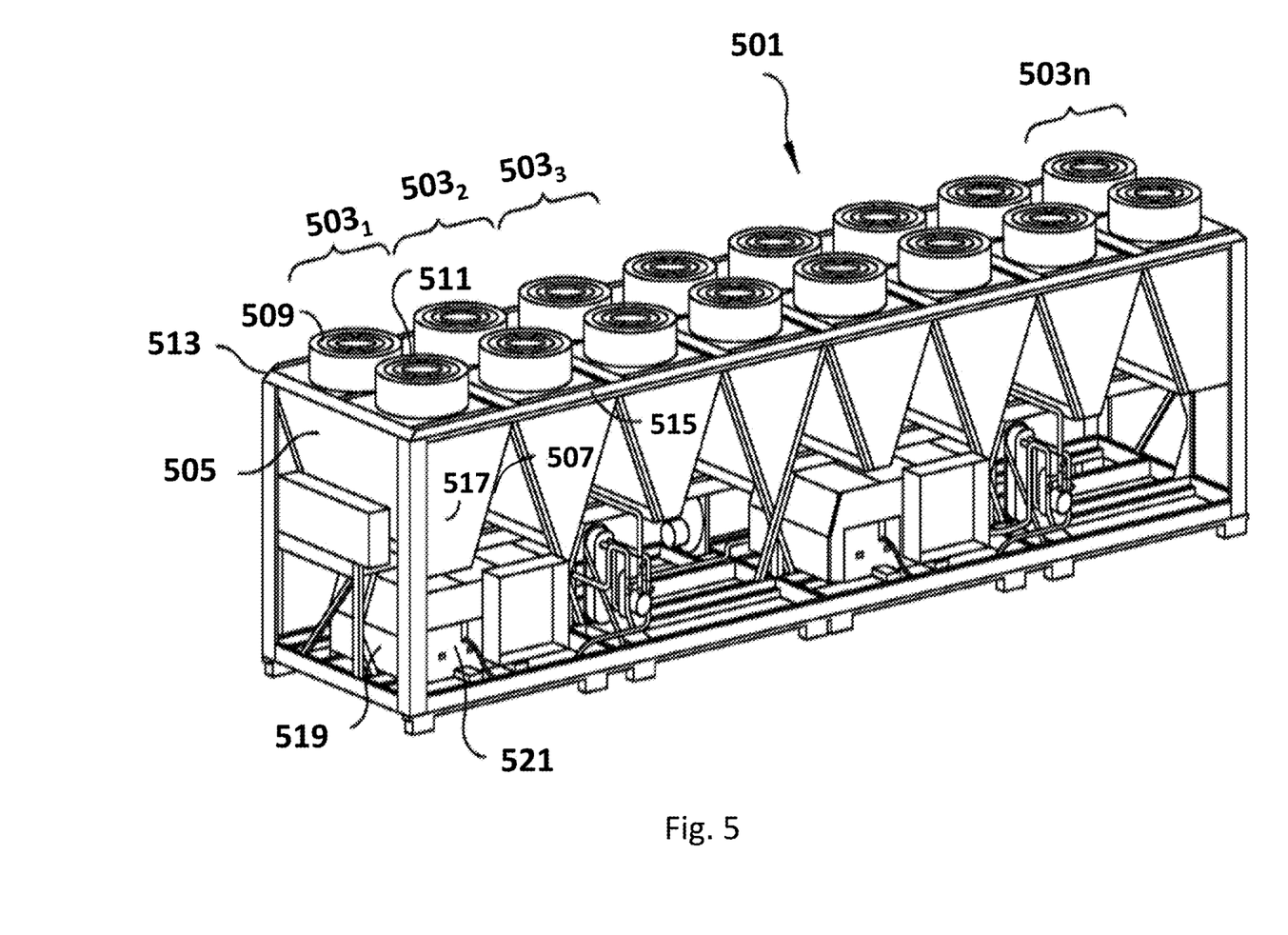
FIG. 5 is an example of an air-cooled chiller having a group of heat exchanger pairs in which multiple pipe connection arrangements as in FIG. 2 are utilised.

FIG. 5 illustrates an air-cooled chiller having a group 501 of heat exchanger pairs 503$_1$, 503$_2$, 503$_3$, . . . 503$n$ (collectively 503) operating in parallel, in which pipe connection arrangements according to embodiments of the disclosure may be utilised. A pair 503 of heat exchangers 505 and 507, which may be microchannel heat exchangers (MCHE), are oriented at an acute angle with respect to each other and converge away from two circulation fans 509, 511. The fans 509, 511 are supported by the heat exchangers 505, 507, additional support members 513, 515 and fan motor support brackets (not shown). Solid covers 517 are positioned on the ends and around the circulation fans 509, 511 such that the circulation fans 509, 511 draw air through the exchangers 505, 507. Two drainage channels 519, 521 are provided to collect and guide water run-off from the coils during defrosting cycles. Refrigeration fluid is supplied to the heat exchangers 505, 507 utilising pipe connection arrangements according to embodiments of the disclosure as described in more detail with reference to FIG. 6.

Figure 6:
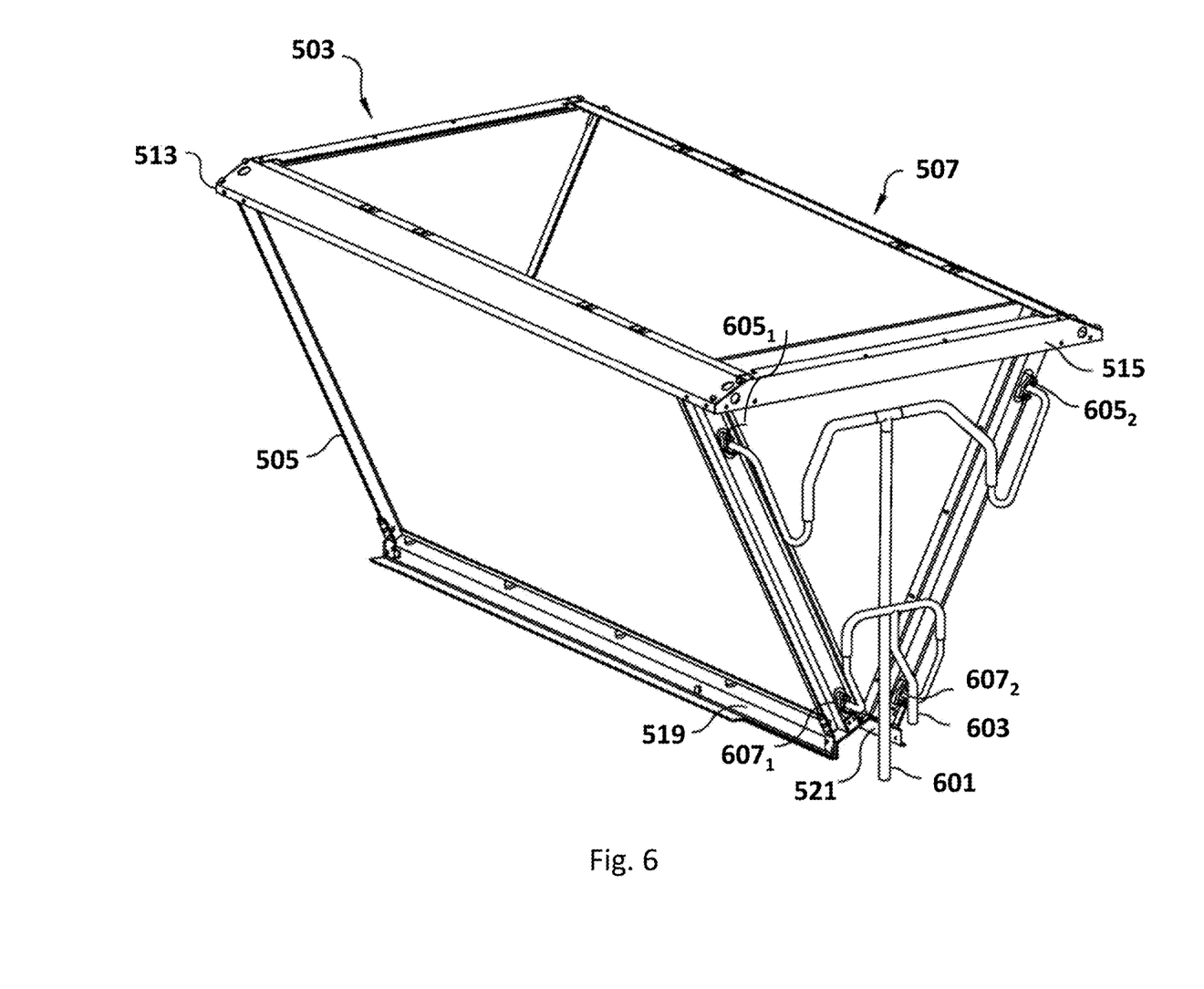
FIG. 6 is a diagram of one heat exchanger pair of FIG. 5 in which a pipe connection arrangement is utilised.

FIG. 6 shows a heat exchanger pair 503 with the circulation fans 509, 511 and cover 517 removed. Each heat exchanger 505, 507 is coupled to a refrigeration or chiller system by inlet 601 and outlet 603 manifolds. Each inlet 601 and outlet 603 manifold may have several inlet 605$_1$, 605$_2$ and outlet 607$_1$, 607$_2$ refrigerant pipe connections that couple with a heat exchanger 505, 507. The refrigerant pipe connections each comprise pipe connection arrangement 200 as described above with reference to FIGS. 2, 3 and 4.

Although not illustrated, it will be appreciated that in other embodiments the block fittings of the Figures may not comprise a plateau portion. For example, as described previously, the surface of the block fitting that faces the flange when the flange is coupled to the block fitting may be flat or substantially flat. In other words, in an embodiment the block fitting of FIGS. 3C and 3D is provided which does not comprise the plateau portion 234'. In this embodiment, the seal 226 will abut the flat or substantially flat surface of the block fitting rather than the plateau portion 234'. Or, the surface of the block fitting may be stepped as in FIGS. 3A and 3B but not comprise a plateau portion 234. In other words, in an embodiment the block fitting of FIGS. 3A and 3B is provided in which no plateau portion 234 projects from the lower portion 238. In this embodiment, the seal 226 will abut the lower portion 238. Other configurations of block fitting are also possible, which may or may not comprise one or more plateau portions.

What is claimed is:

1. A heat exchanger comprising a pipe connection arrangement and a pipe connected by the pipe connection arrangement;
    wherein the pipe connection arrangement comprises:
        a metallic block fitting;
        a flange coupled to the block fitting; and
        a seal;
    wherein:
        the block fitting comprises a bore extending therethrough for receiving the pipe;
        the flange comprises a bore extending therethrough for receiving the pipe;
        the pipe extends through the bore of the flange and into the bore of the block fitting, and the bore of the block fitting is fluidically connected with an opening of the heat exchanger, such that fluid may pass through the pipe into or out of the heat exchanger;
        the block fitting comprises a surface that faces the flange;
        the pipe comprises an annular collar;
        the seal is located between the surface of the block fitting facing the flange and the annular collar of the pipe, wherein one side of the seal abuts the surface of the block fitting facing the flange and another side of the seal abuts the annular collar; and
        the seal comprises a metallic ring and an annular rim of electrically insulating material radially outward of the metallic ring.

2. A heat exchanger as claimed in claim 1, wherein the metallic ring is encapsulated within an electrically insulating material.

3. A heat exchanger as claimed in claim 2, wherein the annular rim is part of the encapsulation or wherein the annular rim is in addition to the encapsulation.

4. A heat exchanger as claimed in claim 1, wherein the surface of the block fitting comprises a plateau portion surrounding the bore and extending towards the flange, and wherein the seal is configured for abutting the plateau portion of the surface of the block fitting.

5. A heat exchanger as claimed in claim 4, wherein the surface of the block fitting is substantially flat or wherein the surface of the block fitting is substantially flat other than the plateau portion.

6. A heat exchanger as claimed in claim 4, wherein the plateau portion has a height of up to 8 mm.

7. A heat exchanger as claimed in claim 1, wherein the pipe connection arrangement further comprises at least one fastener coupling the flange to the block fitting.

8. A heat exchanger as claimed in claim 7, wherein the fastener comprises a bolt.

9. A heat exchanger as claimed in claim 1, wherein the annular rim of electrically insulating material is flexible, and/or wherein the annular rim of electrically insulating material is an elastic material such as an elastic polymer or a rubber material.

10. A heat exchanger as claimed in claim 1, wherein the block fitting comprises aluminium, magnesium, bronze, titanium or alloys thereof,
    and/or wherein the flange comprises steel, stainless steel or plastic composite.

11. A heat exchanger as claimed in claim 1, wherein the heat exchanger is a micro channel heat exchanger (MCHE).

12. A heat exchanger as claimed in claim 11, wherein the heat exchanger is a MCHE of an air cooled chiller.

13. A heat exchanger as claimed in claim 1, wherein the block fitting is integrally formed as part of the heat exchanger or wherein the block fitting is formed as a separate element connected to the heat exchanger.

14. A method of connecting a pipe to a heat exchanger to form a heat exchanger as claimed in claim 1, the method comprising the steps of:
arranging the seal and inserting the pipe into the bore of the block fitting such that the seal is located between and abuts the annular collar of the pipe and the surface of the block fitting; and
arranging the flange over the pipe so that the pipe extends through the bore of the flange and the flange abuts the annular collar of the pipe.

15. A method as claimed in claim 14, wherein arranging the seal comprises arranging the seal on the pipe adjacent the annular collar of the pipe prior to inserting the pipe into the bore of the block fitting;
and the method further comprising coupling the flange to the block fitting.

16. A method as claimed in claim 15, comprising inserting a fastener through the flange and into the block fitting.

17. A method as claimed in claim 14, further comprising coupling the flange to the block fitting.

18. A method as claimed in claim 17, comprising inserting a fastener through the flange and into the block fitting.

\* \* \* \* \*